(12) United States Patent
Wang et al.

(10) Patent No.: US 11,354,541 B2
(45) Date of Patent: Jun. 7, 2022

(54) METHOD, APPARATUS, AND DEVICE FOR VIDEO FRAME INTERPOLATION

(71) Applicant: PEKING UNIVERSITY SHENZHEN GRADUATE SCHOOL, Shenzhen (CN)

(72) Inventors: Ronggang Wang, Shenzhen (CN); Haoxian Zhang, Shenzhen (CN); Zhenyu Wang, Shenzhen (CN); Wen Gao, Shenzhen (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 0 days.

(21) Appl. No.: 16/626,409

(22) PCT Filed: Mar. 7, 2019

(86) PCT No.: PCT/CN2019/077245
§ 371 (c)(1),
(2) Date: Dec. 24, 2019

(87) PCT Pub. No.: WO2020/177108
PCT Pub. Date: Sep. 10, 2020

(65) Prior Publication Data
US 2021/0383169 A1 Dec. 9, 2021

(30) Foreign Application Priority Data
Mar. 1, 2019 (CN) .......................... 201910156565.1

(51) Int. Cl.
*G06K 9/00* (2022.01)
*G06K 9/62* (2022.01)
(Continued)

(52) U.S. Cl.
CPC ......... *G06K 9/6257* (2013.01); *G06K 9/6251* (2013.01); *G06K 9/6262* (2013.01);
(Continued)

(58) Field of Classification Search
CPC ............. G06K 9/6257; G06K 9/00744; G06K 9/6251; G06K 9/6262; G06N 20/00;
(Continued)

(56) References Cited

U.S. PATENT DOCUMENTS

2011/0187924 A1    8/2011   Toraichi et al.
2018/0176574 A1    6/2018   Tang et al.
(Continued)

FOREIGN PATENT DOCUMENTS

CN     102187665 A    9/2011
CN     105517671 A    4/2016
(Continued)

OTHER PUBLICATIONS

International Search Report dated Nov. 27, 2019 for corresponding Application No. PCT/CN2019/077245.

*Primary Examiner* — Ping Y Hsieh
(74) *Attorney, Agent, or Firm* — Miles & Stockbridge P.C.

(57) ABSTRACT

The present specification discloses a method, apparatus, and device for video frame interpolation. The method of embodiment of the present specification comprises: acquiring a video frame training sample, wherein the video frame training sample includes an even number of consecutive video frames and a first key frame, and the first key frame is an intermediate frame of the even number of consecutive video frames; constructing a pyramid deep learning model, wherein each level of the pyramid deep learning model being used to generate intermediate frames of different resolutions has a plurality of convolutional neural network (Continued)

layers; inputting the even number of consecutive video frames to the pyramid deep learning model to generate a second key frame; modifying the pyramid deep learning model according to the second key frame and the first key frame to generate a modified pyramid deep learning model; inputting a plurality of video frames to be processed into the modified pyramid deep learning model to generate an intermediate frame of the plurality of video frames. The invention fully exploits the spatio-temporal domain information between multi-frame video frames, and adopts a pyramid refinement strategy to effectively estimate the motion information and the occlusion region, thereby greatly improving the quality of the intermediate frame.

11 Claims, 4 Drawing Sheets

(51) Int. Cl.
| | | |
|---|---|---|
| *G06T 7/207* | (2017.01) | |
| *G06N 20/00* | (2019.01) | |
| *G06T 3/00* | (2006.01) | |
| *G06T 3/40* | (2006.01) | |
| *G06V 20/40* | (2022.01) | |

(52) U.S. Cl.
CPC ............ *G06N 20/00* (2019.01); *G06T 3/0093* (2013.01); *G06T 3/4046* (2013.01); *G06T 3/4053* (2013.01); *G06T 7/207* (2017.01); *G06V 20/46* (2022.01); *G06T 2207/10016* (2013.01); *G06T 2207/20016* (2013.01); *G06T 2207/20084* (2013.01)

(58) Field of Classification Search
CPC ... G06T 3/0093; G06T 3/4046; G06T 3/4053; G06T 7/207; G06T 2207/10016; G06T 2207/20016; G06T 2207/20084
See application file for complete search history.

(56) References Cited

U.S. PATENT DOCUMENTS

| | | | |
|---|---|---|---|
| 2019/0138889 A1* | 5/2019 | Jiang | G06N 3/0454 |
| 2020/0012940 A1 | 1/2020 | Liu et al. | |
| 2020/0074642 A1* | 3/2020 | Wilson | G06T 7/269 |
| 2020/0285857 A1* | 9/2020 | Vaquero | G06K 9/00604 |
| 2020/0394752 A1* | 12/2020 | Liu | G06N 5/046 |

FOREIGN PATENT DOCUMENTS

| | | |
|---|---|---|
| CN | 107578377 A | 1/2018 |
| CN | 108492326 A | 9/2018 |
| CN | 108596258 A | 9/2018 |
| CN | 108734660 A | 11/2018 |
| CN | 109151474 A | 1/2019 |
| CN | 109379550 A | 2/2019 |
| WO | 2018170393 A2 | 9/2018 |
| WO | 2020177108 A1 | 9/2020 |

* cited by examiner

METHOD, APPARATUS, AND DEVICE FOR VIDEO FRAME INTERPOLATION

PRIORITY INFORMATION

The present application is a national stage filing under 35 U.S.C. § 371 of PCT/CN2019/077245, filed on Mar. 7, 2019 which claims priority to CN Application No. 201910156565.1 filed on Mar. 1, 2019. The applications are incorporated herein by reference in their entirety.

FIELD

The present specification relates to the technical field of computer, and more particularly relates to a method, apparatus, and device for video frame interpolation.

BACKGROUND

With video frame interpolation techniques (or super frame rate technology) and related applications are rapidly evolving, it has a wide range of applications, such as novel view synthesis, frame rate up-conversion, 4K video conversion and slow-motion video generation. Since these applications need to synthesize video intermediate frames that do not exist, how to make the intermediate frames more realistic and reasonable is a key technology in practical applications.

In the prior art, most generation methods for video intermediate frame are firstly to estimate optical flow between two adjacent frames, and then interpolate the intermediate frame according to the optical flow. These methods heavily depend on the quality of optical flow, otherwise the intermediate frames resulting would be with significant artifacts. And the calculation of optical flow requires a complicated optimization process, which is very time consuming.

SUMMARY

In view of this, embodiments of the present specification provide a method, apparatus, and device for video frame interpolation.

In order to solve the above technical problem, the embodiment of the present specification is implemented in this way:

Embodiments of the present specification provide a method for video frame interpolation, comprising:

acquiring a video frame training sample, wherein the video frame training sample includes an even number of consecutive video frames and a first key frame, and the first key frame is an intermediate frame of the even number of consecutive video frames;

constructing a pyramid deep learning model, wherein each level of the pyramid deep learning model being used to generate intermediate frames of different resolutions has a plurality of convolutional neural network layers;

inputting the even number of consecutive video frames to the pyramid deep learning model to generate a second key frame;

modifying the pyramid deep learning model according to the second key frame and the first key frame to generate a modified pyramid deep learning model;

inputting a plurality of video frames to be processed into the modified pyramid deep learning model to generate an intermediate frame of the plurality of video frames.

Embodiments of the present specification provide an apparatus for video frame interpolation, comprising:

a video frame training set acquisition module configured for acquiring a video frame training sample, wherein the video frame training sample includes an even number of consecutive video frames and a first key frame, and the first key frame is an intermediate frame of the even number of consecutive video frames;

a pyramid deep learning model construction module configured for a pyramid deep learning model, wherein each level of the pyramid deep learning model being used to generate intermediate frames of different resolutions has a plurality of convolutional neural network layers;

a second key frame generation module configured for inputting the even number of consecutive video frames to the pyramid deep learning model to generate a second key frame;

a pyramid deep learning model modification module configured for modifying the pyramid deep learning model according to the second key frame and the first key frame to generate a modified pyramid deep learning model;

an intermediate frame generation module configured for inputting a plurality of video frames to be processed into the modified pyramid deep learning model to generate an intermediate frame of the plurality of video frames.

Embodiments of the present specification provide a device for video frame interpolation, comprising:

at least one processor; and a memory in communication connection with the at least one processor; wherein, the memory stores instructions that may be executed by the at least one processor; and the instructions are executed by the at least one processor to enable the at least one processor to:

acquiring a video frame training sample, wherein the video frame training sample includes an even number of consecutive video frames and a first key frame, and the first key frame is an intermediate frame of the even number of consecutive video frames;

constructing a pyramid deep learning model, wherein each level of the pyramid deep learning model being used to generate intermediate frames of different resolutions has a plurality of convolutional neural network layers;

inputting the even number of consecutive video frames to the pyramid deep learning model to generate a second key frame;

modifying the pyramid deep learning model according to the second key frame and the first key frame to generate a modified pyramid deep learning model;

inputting a plurality of video frames to be processed into the modified pyramid deep learning model to generate an intermediate frame of the plurality of video frames.

The above at least one technical solution used by the embodiment of the present specification can achieve the following beneficial effects:

The present specification adopts a pyramid deep learning model to synthesize low-resolution video intermediate frames from low-resolution video frames, then, each level of the pyramid modifies the motion information obtained by the pyramid once by estimating the residual motion information between the video frames while increasing the resolution, and finally synthesizes the intermediate frame with different resolutions. The invention adopts a pyramid precision strategy, from coarse to fine, effectively estimates the motion information and the occlusion region, and improves the quality of the intermediate frame by exploiting the spatio-temporal domain information between multiple frames.

BRIEF DESCRIPTION OF THE DRAWINGS

The drawings described herein are provided to provide a further understanding of the present specification and constitute a part of the present specification, the illustrative embodiments of the present specification and the description thereof are for explaining the present specification and do not constitute an undue limitation of the present specification. In the drawing.

DETAILED DESCRIPTION OF EMBODIMENTS

To make the objects, technical solutions, and advantages of the present specification much clearer, the technical solutions of the present specification will be described clearly and sufficiently with reference to the embodiments and corresponding drawings of the present specification. Apparently, the embodiments described herein are only part of the embodiments of the present specification, not all of them. All other embodiments obtained by those skilled in the art without exercise of inventive work based on the embodiments in the present specification shall fall within the protection scope of the present specification.

The technical solutions provided by the embodiments of the present specification are described in detail below with reference to the accompanying drawings.

Figure 1:
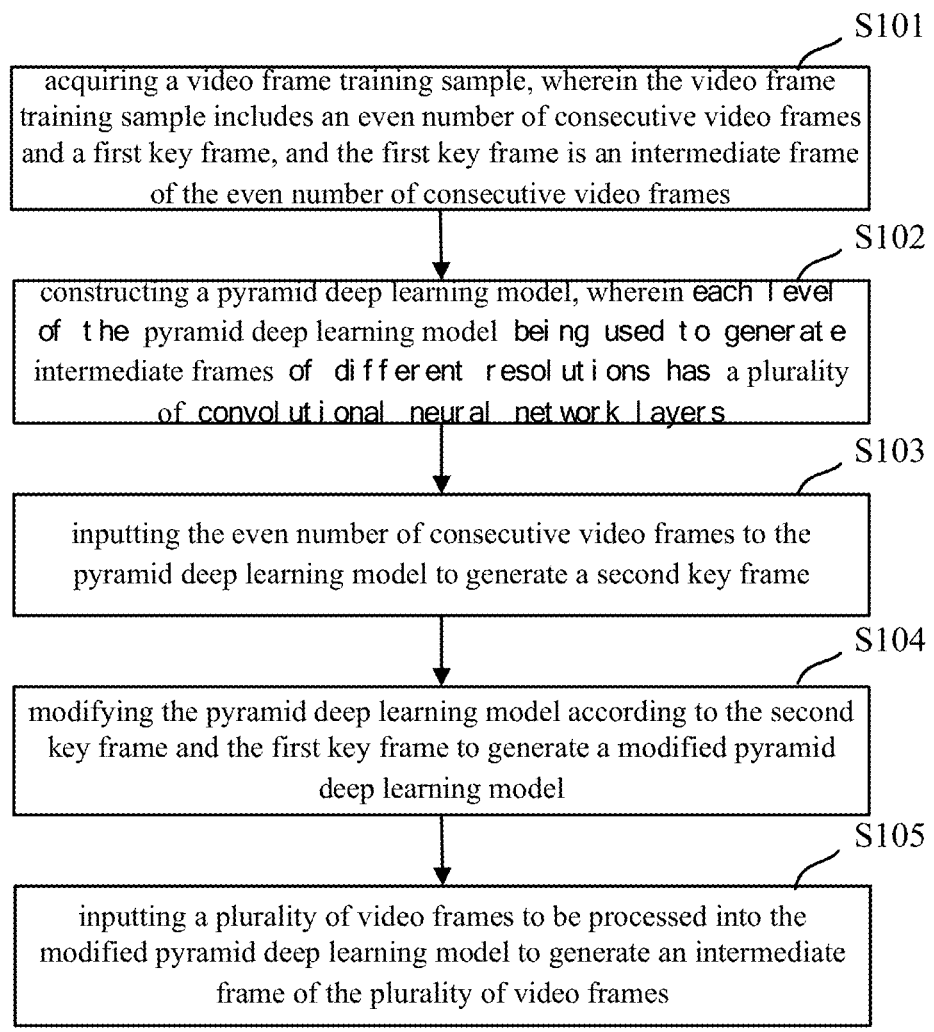
FIG. 1 shows a flow diagram of a method for video frame interpolation according to an embodiment of the present specification.

FIG. 1 shows a flow diagram of a method for video frame interpolation according to an embodiment of the present specification. From a program perspective, the execution body of the process can be a program or application client mounted on the application server.

As shown in FIG. 1, the process can include the following steps:

Step 101: acquiring a video frame training sample, wherein the video frame training sample includes an even number of consecutive video frames and a first key frame, and the first key frame is an intermediate frame of the even number of consecutive video frames.

In the embodiment of the present specification, a key frame is an intermediate frame of a plurality of video frames. In addition, the "first", "second", etc. in this article are only used to distinguish, and have no practical meaning.

When training, a large amount of video frame data is required. Each set of video frame data is a video frame training sample, and the video frame training sample includes an even number of video frames, at least two, and four or more are better. The "consecutive" refers to be continuous in time, if there are 4 video frames in the video frame set, they are marked as video frame 1, video frame 2, video frame 3 and video frame 4 in time sequence. The first key frame is located between video frame 2 and video frame 3. The purpose of the training is to use the training model to interpolate the video frame 1, the video frame 2, the video frame 3, and the video frame 4, and to obtain the intermediate frame of the video frame 2 and the video frame 3 (i.e., the second key frame), and then to be compared to the first key frames to modify the training model.

When training video frame data selection, a continuous 5 frames of video frames may be selected in the original video frame data, and the middle frame is used as the first key frame.

Step 102: constructing a pyramid deep learning model, wherein each level of the pyramid deep learning model being used to generate intermediate frames of different resolutions has a plurality of convolutional neural network layers.

In the embodiment of the present specification, the pyramid deep learning model includes multiple levels, and each level may generate an intermediate frame according to inputting multiple video frames, except that the resolution of each input video frame is different, and the generated intermediate frame is also with the resolution of the input video frame. Moreover, from the lower level to the upper level, the resolution is gradually increased. Taking the 3-level pyramid as an example, the resolution of the first level is ¼ of the original resolution, and the resolution of the second level is ½ of the original resolution, the resolution of the third level is the original resolution. In addition, each level of the pyramid does not exist independently, and the video frame parameters of the lower level resolution are used for the calculation of the intermediate frame of the higher resolution. The video frame data may be motion information, an occlusion area, or the like.

Convolutional neural networks are deep neural networks with convolutional structures that reduce the amount of memory used by deep networks.

The three key operations which effectively reduces the number of parameters of the network and alleviates the over-fitting problem of the model are: one is the local receptive field, the other is the weight sharing, and the third is the pooling layer.

Convolutional neural network's architecture: Convolutional neural network is a multi-layered supervised learning neural network, and the convolutional layer and the pool sampling layer of the hidden layer are the core modules for implementing the feature extraction function of the convolutional neural network. The network model minimizes the loss function by using the gradient descent method to adjust the weight parameters in the network layer by layer, and improves the accuracy of the network through frequent iterative training. The low hidden layer of the convolutional neural network is composed of alternating convolutional layers and maximum pool sampling layers, and the upper layer is the hidden layer and logistic regression classifier of the full connection layer corresponding to the traditional multilayer perceptron. The input of the first fully connected layer is a feature image obtained by feature extraction from the convolutional layer and the sub-sampling layer. The last layer of the output layer is a classifier that can be classified using logistic regression, Softmax regression, or even support vector machines.

The convolutional neural network structure includes: a convolutional layer, a sampling layer, and a full-link layer. Each layer has a plurality of feature maps, each of which extracts a feature of the input through a convolution filter, and each feature map having a plurality of neurons.

After the input image statistics and the filter are convoluted, the local feature is extracted, and once the local feature is extracted, the positional relationship between the local feature and other features is also determined. The input of each neuron is connected to the local receptive field of the previous layer. Each feature extraction layer is followed by a calculation layer for local averaging and secondary extraction, which also called a feature mapping layer. Each computing layer of the network is composed of multiple feature mapping planes, and the weights of all neurons on the feature mapping are equal.

Usually, the mapping from the input layer to the hidden layer is called a feature mapping, that is, the feature extraction layer is obtained through the convolution layer, and the feature mapping layer is obtained after pooling.

The advantages of convolutional neural networks in image understanding compared to general neural networks are:

1) The network structure can better adapt to the structure of the image;
2) Simultaneous feature extraction and classification, so that feature extraction can help feature classification;
3) Weight sharing can reduce the training parameters of the network, and it can make the neural network structure simpler and more adaptable.

The main point of the present invention is to make full use of the correlation between a plurality of continuous frames by using a coarse to fine refinement frame, thereby improving the quality of the intermediate frames produced.

Step 103: inputting the even number of consecutive video frames to the pyramid deep learning model to generate a second key frame.

In the embodiment of the present specification, the parameters of the pyramid deep learning model are preset, and an even number consecutive video frames are inputted according to different requirements of each layer, and each layer correspondingly outputs an intermediate frame of different resolutions, which is The result of the calculation by the pyramid deep learning model.

In the embodiment of the present specification, the second key frame may be one video frame, and may also be multiple video frames.

Step 104: modifying the pyramid deep learning model according to the second key frame and the first key frame to generate a modified pyramid deep learning model.

In the embodiment of the present specification, the video intermediate frame generated by the pyramid deep learning model, that is, the second key frame, is compared with the real video intermediate frame (i.e., the first key frame), and according to the difference between the second key frame and the first key frame, the model parameters of the pyramid deep learning model are modified until the difference between the calculated intermediate frame and the real intermediate frame generated by the modified pyramid deep learning model is within the set range. Then, it can be considered that the pyramid deep learning model has been trained.

Step 105: inputting a plurality of video frames to be processed into the modified pyramid deep learning model to generate an intermediate frame of the plurality of video frames.

In the embodiment of the present specification, the modified pyramid deep learning model is used to perform video frame interpolation to obtain a video intermediate frame.

The method in FIG. 1 adopts the pyramid deep learning model to synthesize low-resolution video intermediate frames from low-resolution video frames, then, each level of the pyramid modifies the motion information obtained by the pyramid once by estimating the residual motion information between the video frames while increasing the resolution, and finally synthesizes the intermediate frame with the resolution. The invention adopts a pyramid precision strategy, from coarse to fine, effectively estimates the motion information and the occlusion region, and fully exploits the spatiotemporal domain information between multiple frames, thereby improving the quality of the intermediate frame.

Based on the method of FIG. 1, some embodiments of the method are also provided in the embodiments of the present specification, which are described below.

Further, the inputting the even number of consecutive video frames to the pyramid deep learning model specifically comprises:

determining a first resolution of a video frame inputted to the first level of the pyramid deep learning model according to a preset rule;

processing the even number of consecutive video frames according to the first resolution;

inputting the processed even number of consecutive video frames to the first level of the pyramid deep learning model to generate an optical flow set and an occlusion mask set of the intermediate frame to each video frame of the processed even number of consecutive video frames;

generating a calculated intermediate frame of the first level according to the optical flow set and the occlusion mask set;

modifying parameters of the first level of the pyramid deep learning model according to the calculated intermediate frame of the first level and the real intermediate frame with the resolution of the first level.

In the embodiment of the present specification, the pyramid deep learning model has multiple levels, and the first level is different from the other levels, and the first level is defined as the top level of the pyramid. Here we focus on the method of calculating the intermediate frame of the first level of the pyramid.

Firstly, it is necessary to determine the resolution of the video frame inputted to the first level of the pyramid, which can be determined according to the number of levels of the pyramid. If the pyramid has two levels, the resolution of the video frame inputted to the first level is ½ of the original resolution, the second level is the original resolution. If the pyramid has three levels, the resolution of the video frame inputted to the first level is ¼ of the original resolution, and the resolution of the video frame inputted to the second level is ½ of the original resolution, and the video frame inputted to the third level is the original resolution. Then, the preset rule may be: the first level resolution is: ½ (a−1), where a is the total number of levels of the pyramid, and the resolution of the K-th level is: ½ (a−k). According to the above formula, it can be inferred that for the 8-level pyramid, the resolution of the input video frame of the sixth level is ¼.

After determining the resolution of the video frame, a few consecutive video frames just need to be subjected to downsampling processing to obtain video frames with different resolutions. Then, according to the input video frame, the collinear optical flow set and the occlusion mask set of the intermediate frame to each video frame are obtained. If there are multiple video frames, the collinear optical flow set and the occlusion mask set correspond to multiple optical flow matrices and occlusion mask matrices. Finally, an intermediate frame with the resolution of is obtained according to the above content, that is a calculated intermediate frame.

The optical flow diagram represents the displacement information of the pixel points between two frames (assuming the optical flow diagram of the first frame to the second frame), each pixel position (x, y) of the optical flow diagram corresponds to (Δx, Δy), indicating that the pixel point of the pixel position of the first frame passes (Δx, Δy), and moves to the pixel position of the second frame (x+Δ) x,y+Δy). Here, the optical flow deformation refers to the use of optical flow information to change the second frame into the first frame.

The first intermediate level corresponds to the real intermediate frame of the resolution, which can be understood as the intermediate frame in which the first key frame (the original resolution) is subjected to the resolution down to the resolution of the first level. For example, if the resolution of the first level is ⅛, the real intermediate frame with the resolution of the first level is to reduce the resolution of the first key frame to a video frame of ⅛ of the original resolution. Then, according to the difference between the calculated intermediate frame and the real intermediate frame, the parameters of the convolutional neural network layer in the first level pyramid are modified to minimize the difference between the calculated intermediate frame and the real intermediate frame.

Further, determining a second resolution of the video frame inputted to the K-th level of the pyramid deep learning model according to a preset rule, wherein a resolution of the video frame inputted to the K-th level is higher than a resolution of a video frame inputted to the (K−1)th level, the resolution of the last input video frame of the pyramid deep learning model is the original resolution of the even number of consecutive video frames, and K is a natural number greater than or equal to 2;

processing the even number of consecutive video frames according to the second resolution to generate a video frame inputted to the K-th level;

interpolation of each optical stream in the optical flow set generated by the (K−1)th level by upsampling by 2 times to generate a first optical flow set;

processing the video frame inputted to the K-th level by using each optical flow in the first optical flow set to generate a first warped image set;

generating a residual flow set and a occlusion mask set of the K-th level according to the first optical flow set and the first warped image set;

generating an optical flow set of the K-th level according to the first optical flow set and the residual flow set;

generating a calculated intermediate frame of the K-th level according to the optical flow set of the K-th level and the occlusion mask set of the K-th level;

modifying parameters of the first level to the K-th level of the pyramid deep learning model according to the calculated intermediate frame of the K-th level and the real intermediate frame with the resolution of the K-th level.

The above content specifically describes how to calculate the intermediate frame generation for the second of the pyramids and the level above the second level of the pyramid. The above method is identical to most of the first level of the pyramid, the only difference being the way in which the collection of optical flows is calculated.

Calculation of the optical flow of the K-th level: the optical flow of the (K−1)th level is interpolated by the upsampling $2x$ resolution to obtain the optical flow set with the resolution of the K-th level. Then, the video frame inputted to the K-th level is deformed to obtain a warped image set and an occlusion mask set by using the optical flow with the resolution of the K-th level. Generating a residual flow set according to the optical flow set and the warped image set, then, the residual flow set is added to the optical flow set of the K-th level resolution to obtain the optical flow set of the K-th level, and then the intermediate frame of the K-th level is generated according to the optical flow set of the K-th level and the occlusion mask set.

In addition, it should be noted that when there is a difference between the calculated intermediate frame of the K-th level and the real intermediate frame with the resolution of the K-th level, it is necessary to simultaneously modify the parameters of the first level to the K-th level of the pyramid deep learning model. This is because the parameters of the first level to the K-th level pyramid are directly or indirectly used in the calculation of the intermediate frame of the K-th level, and modification is required at the same time.

The method provided by the present invention estimates the motion information and the occlusion region between the downsampled small resolution video frames through the top level of the pyramid, and synthesizes the small resolution video intermediate frame. Then, each level below the top level of the pyramid, while increasing the resolution, modifies the motion information obtained by the level above the pyramid by estimating the residual motion information between the video frames, and synthesizes the corresponding intermediate frame of the resolution video. And so on, finally getting accurate motion information to synthesize the original resolution video intermediate frame.

Further, the generating a calculated intermediate frame of the K-th level according to the optical flow set of the K-th level and the occlusion mask set of the K-th level specifically comprises:

generating a second warped image set through warping the inputted video frames by optical flow set at the K-th level;

generating a calculated intermediate frame of the K-th level according to the second warped image set and the occlusion mask set of the K-th level, specifically comprises:

the calculated intermediate frame of the K-th level is calculated by the following formula:

$$I_{t,k} = \sum_{i=1}^{4} M_{k,i} \otimes w(I_{k,i}, F_{k,i})$$

wherein $I_{t,k}$ denotes a calculated intermediate frame of the K-th level, $M_{k,i}$ denotes an occlusion mask relative to the ith warped image in the first warped image set, $w(I_{k,i}, F_{k,i})$ denotes the i-th warped image in the first set of warped images, $\otimes$ denotes point multiplication of matrices.

Further, the processing the even number of consecutive video frames according to the second resolution comprises:

generating a 4D feature map according to the even number of consecutive video frames by using a feature extractor;

splitting the 4D feature map in the depth dimension, and then stacking them in the channel dimension to generate a 3D feature map;

an average pooling process on the 3D feature map to generate a feature map with the resolution of the K-th level;

downsampling the even number of consecutive video frames to generate a set of input video frames with the resolution of the K-th level;

inputting the feature map with the resolution of the K-th level and the set of input video frames with the resolution of the K-th level to the K-th level of the pyramid deep learning model.

In the embodiment of the present specification, a feature extractor based on 3D convolution is further provided to mine context information of a spatio-temporal domain between multiple frames. Specifically: using a 3D U-net architecture (3D U-net feature extractor), the feature extractor takes multiple original resolution video frames as input, and outputs a 4D feature map (multi-frame image input, outputting a feature map. The four dimensions are depth, height, width, and channel). The 4D feature map is split in the depth dimension and then combined in the channel dimension to generate a 3D feature map (height, width, and channel) (3D multi-frame context feature). The 3D feature map is transformed into different feature maps by averaging pooling, and is fed into the corresponding level of the multi-frame pyramid deep learning framework to help it make better use of spatio-temporal domain information between multiple frames.

The 3D U-net feature extractor consists of a 4-hierarchy encoder and a 3-hierarchy decoder. In the encoder part, each layer contains a 3×3×3 convolution followed by a Leaky ReLu($\alpha$=0.1) and a 2×2×2 max pooling (except for the first and the last layers). The first pooling layer has kernel size of 1×2×2 with the intention of not to merge the temporal signal too early.

In the decoder part, each layer consists of an upconvolution of 3×3×3 by stride of two in each dimension (the upconvolution of the last layer of the decoder with a stride of two only in spatial dimension), and a 3×3×3 convolution.

The above upconvolution and convolution are followed by a Leaky ReLu, respectively. Thus, our extractor takes a 4×h×w×3 (depth×height×width×channel) volume as input and outputs a 4×h×w×8 feature map. The output is converted to a h×w×32 3D-multi-frame-context feature through splitting the output in the depth dimension and stacking them in the channel dimension. As shown in FIG. 1, the 3D-multi-frame-context feature is downsampled by average pooling and stacked with the first layer of U-net at the each level of MPR framework.

Further, the processing the even number of consecutive video frames according to the second resolution specifically comprises:

inputting the even number of consecutive video frames to the 3D pyramid feature extractor to generate a 4D feature map;

processing the 4D feature map is processed by using a convolution with a step size of 2 to generate a 4D feature map with the resolution of the K-th level;

splitting the 4D feature map with the resolution of the K-th level in the depth dimension, and then stacking them in the channel dimension to generate a 3D feature map with the resolution of the K-th level;

downsampling the even number of consecutive video frames to generate a set of input video frames with the resolution of the K-th level;

inputting the 3D feature map with the resolution of the K-th level and the set of input video frames with the resolution of the K-th level to the K-th level of the pyramid deep learning model.

In the embodiment of the present specification, another feature extractor based on three-Dimensional convolution is provided to mine context information of a multi-frame time-space domain. The feature extractor adopts a feature pyramid structure (3D pyramid feature extractor), and each level of the pyramid uses two layers of 3D convolution to generate a 3D feature map (3D multi-frame context feature). The feature layer resolution is then reduced by ½ by a convolution of step size 2. Feature maps with different resolutions are passed to the corresponding levels of the multi-frame pyramid deep learning framework to help make better use of spatio-temporal domain information between multiple frames.

Further, the modifying the pyramid deep learning model according to the second key frame and the first key frame specifically comprises:

extracting a first characteristic parameter of the first key frame;

extracting a second characteristic parameter of the second key frame;

generating a difference result between the first key frame and the second key frame according to the first feature parameter and the second feature parameter;

adjusting weight parameters of the pyramid deep learning model according to the difference result.

Further, the modifying parameters of the first level to the K-th level of the pyramid deep learning model according to the calculated intermediate frame of the K-th level and the real intermediate frame with the resolution of the K-th level specifically comprises:

extracting a third characteristic parameter of the calculated intermediate frame by using a multi-level convolution layer of the pre-training network, wherein, the larger the value of K, the more layers of the multi-level convolution layer;

extracting a fourth feature parameter of the real intermediate frame by using the multi-level convolution layer of the pre-training network;

comparing the third feature parameter and the fourth feature parameter by using an L2 paradigm to generate a difference result;

modifying parameters of the first level to the K-th level of the pyramid deep learning model according to the difference result.

The embodiment of the present specification also provides a multi-step perceptual loss function to train a pyramid deep learning model. Specifically, for the low-resolution pyramid level, the low-level convolutional layer of the pre-training network is used (the low-level convolutional layer obtains low-level semantic information such as edges, lines, and angles, and the high-level convolutional layer can obtain more Advanced semantic information, retaining more details) to extract the characteristics of the output and the true value respectively. And the L2 paradigm is used to compare the difference between the two features to train the network; as the resolution of the pyramid level is gradually increased, the higher-level convolutional layer of the pre-trained network is used to extract the characteristics of the output and the true value respectively. The difference between the two features is compared by the L2 paradigm. Through a large amount of data training (the difference between the intermediate frame and the real intermediate frame is generated by the loss function comparison, the difference is propagated back to the network, and the weight parameter of the network is modified, so that the intermediate frame and the real intermediate frame are increasingly approached). Finally, a deep learning network with multiple frames as input and intermediate frames between multiple frames can be obtained.

It should be pointed out that the low-resolution intermediate frame pays more attention to the accuracy of motion prediction. Therefore, using low-level convolutional layers to extract local features effectively improves the accuracy of motion prediction. The high-resolution intermediate frame gradually focuses on the quality and detail of the generated intermediate frame. Therefore, feature extraction is performed using a high-level convolution layer.

The invention provides two three-dimensional convolution-based feature extractors (3D U-net feature extractor, 3D pyramid feature extractor) to mine context information of multi-frame time-space domain. These feature information will be embedded in the corresponding level of the multi-frame pyramid deep learning framework, which helps to make better use of spatio-temporal information between multiple frames. The embodiment of the present specification provides a multi-step perceptual loss function to train a pyramid deep learning model. For the low-resolution pyramid level, the low-level convolutional layer of the pre-training network is used to extract the characteristics of the output and the true value respectively. And the L2 paradigm is used to compare the difference between the two features to train the network; as the resolution of the pyramid level is gradually increased, the higher-level convolutional layer of the pre-trained network is used to extract the characteristics of the output and the true value respectively.

In addition to adopting the pyramid optimization strategy, the present invention can also take multi-frame (2 frames or more) video frames as inputted to fully utilize information between multiple frames, and to effectively solve problems such as occlusion and motion blur, and to improve the robustness of the synthesized intermediate frame.

Figure 2:
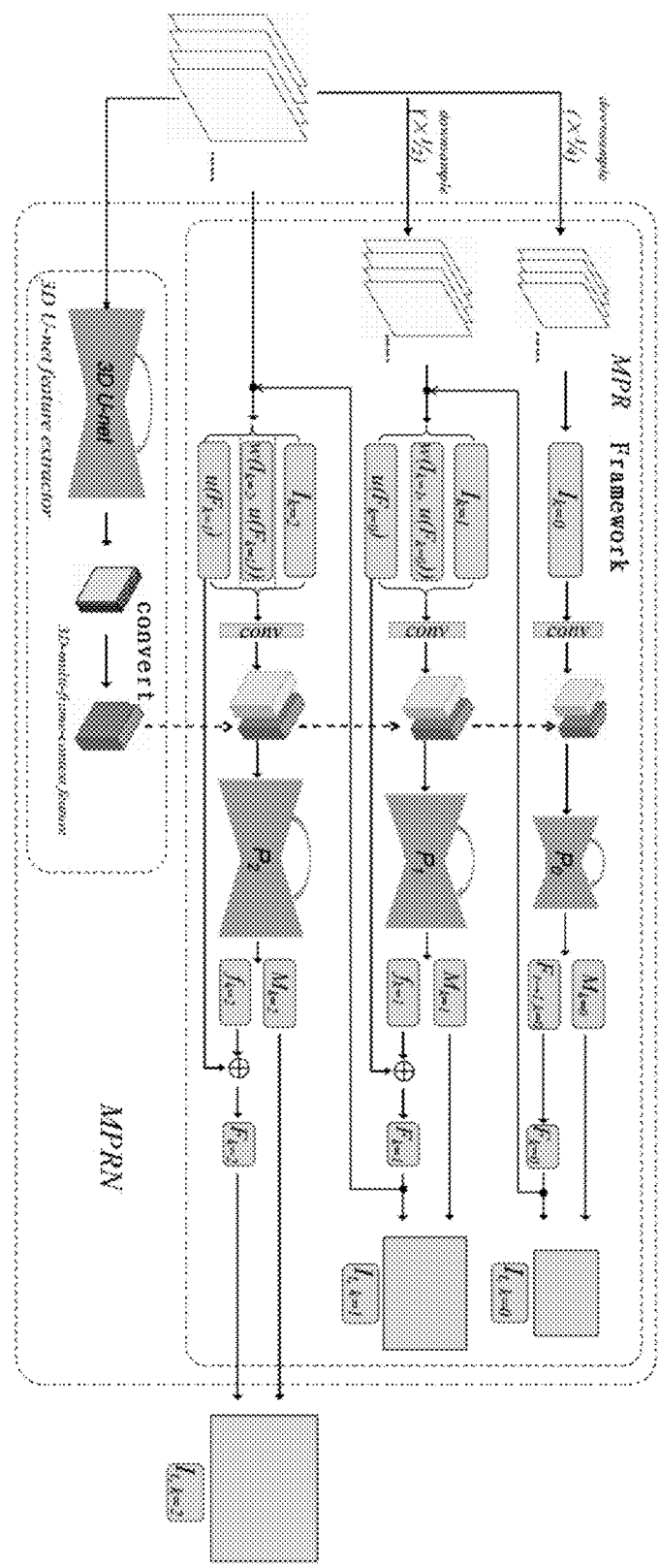
FIG. 2 shows a structural diagram of a pyramid deep learning model according to Embodiment 1 of the present specification.
Figure 3:
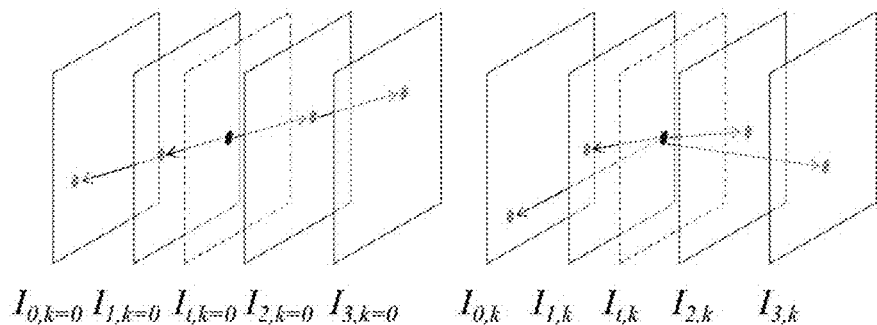
FIG. 3 shows a schematic diagram of optical flow of intermediate frames of each level of the pyramid to each video frame.

FIG. 2 shows a structural diagram of a pyramid deep learning model according to Embodiment 1 of the present specification. As shown in FIG. 2, P0, P1, and P2 are respectively U-net convolutional neural networks corresponding to each level of the three-level pyramid, and cony represents a convolutional layer. In this embodiment, an intermediate frame between the second frame and the third frame is generated with four frames as input. First, the figure is a deep learning refinement framework of a three-level pyramid with four frames as input. The 0th level pyramid takes the ¼ downsampled four frame image $I_{k=0}$ as input, and outputs the collinear optical flow set $F_{k=0}$ and the occlusion mask set $M_{k=0}$. The collinear optical flow is shown in FIG. 3 (left). Four ¼ downsampled video frames are deformed by optical flow to generate four ¼ resolution warped images. The four ¼ resolution warped images are multiplied by the corresponding occlusion mask, and then the multiplied results are added together to obtain a ¼ resolution intermediate frame. The first level pyramid takes four ½ downsampled frame video frames $I_{k=1}$, the upper layer optical flow upsampled result $u(F_{k=0})$, and a set of warped images $w(I_{k=1}, u(F_{k=0}))$ obtained by deforming the video frame $I_{k=1}$ by the optical flow $u(F_{k=0})$ as input, and outputs a residual flow set $f_{k=1}$ and the occlusion mask set $M_{k=1}$. The optical flow set of the first level is $F_{k=1}=u(F_{k=0})+f_{k=1}$, and the modified optical flow is as shown in FIG. 3 (right). The ½ resolution intermediate frame of this level is similarly obtained by Fk=1 and Mk=1. The last level pyramid takes four original resolution frame video frames $I_{k=2}$, the upper level optical flow upsampled result u(Fk=i), and a set of warped images $w(I_{k=2}, u(F_{k=1}))$ obtained by deforming the video frame $I_{k=2}$ by the optical flow $u(F_{k=1})$ as input, and outputs a residual flow set $f_{k=2}$ and the occlusion mask set $M_{k=2}$. The optical flow set of the first level is $F_{k=2}=u(F_{k=1})+f_{k=2}$, and the final intermediate frame is obtained by Fk=2 and Mk=2.

This embodiment adopts a 3D U-net feature extractor, which takes 4 original resolution video frames as input and outputs a 4D feature map. The 4D feature map is split in the depth dimension and then combined in the channel dimension to generate a 3D feature map (3D multi-frame context feature). The 3D feature map is transformed into different feature maps by averaging pooling, and is transmitted to the corresponding level in the above-mentioned three-level pyramid deep learning framework with 4 video frames as input to help better explore spatio-temporal information between multiple frames. The feature extraction process is embedded in the solution process of the three-level pyramid deep learning framework with 4 video frames as input.

Intermediate frames at ¼ resolution, ½ resolution, and native resolution will serve as supervisory information for each level of the pyramid. The 0th level pyramid uses the conv2_2 convolutional layer of the pre-training network VGG19 to extract the output result of the ¼ resolution video frame and the feature of the real value respectively, and compares the difference between the two features by the L2 paradigm. The first level pyramid uses the conv3_2 convolutional layer of the pre-training network VGG19 to extract the output result of the ½ resolution video frame and the feature of the real value respectively, and compares the difference between the two features by the L2 paradigm. The second level pyramid uses the conv4_3 convolutional layer of the pre-training network VGG19 to extract the features of the final result and the real value respectively, and compares the difference between the two features by the L2 paradigm. A deep learning network with 4 frames of video frames as input and an intermediate frame between the second and third frames can be obtained through a large amount of data training.

Figure 4:
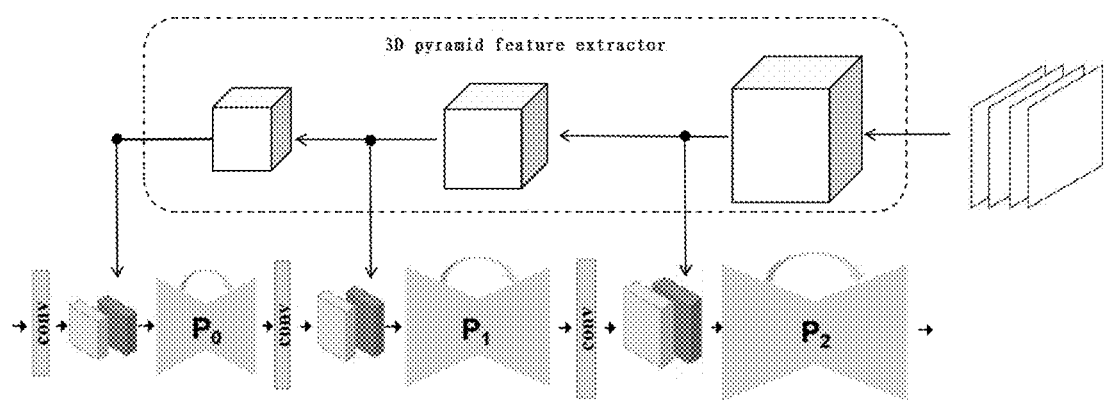
FIG. 4 shows a structural diagram of a pyramid deep learning model according to Embodiment 2 of the present specification.

FIG. 4 shows a structural diagram of a pyramid deep learning model according to Embodiment 2 of the present specification. As shown in FIG. 4, compared with the first embodiment, this embodiment is differs in that: this embodiment adopts a 3D pyramid feature extractor with four original resolution video frames as input, and each level of the pyramid uses two layers of 3D convolution to generate a 3D feature map (3D multi-frame context feature), then, the feature layer resolution is reduced by ½ by convolution with a step size of 2. Feature maps with different resolutions are passed into the corresponding levels of the three-level pyramid deep learning framework with 4 video frames as input to help better explore the spatio-temporal domain information between multiple frames, as shown in FIG. 4. The feature extraction process is embedded in the solution process of the three-level pyramid deep learning framework with 4 video frames as input.

Figure 5:
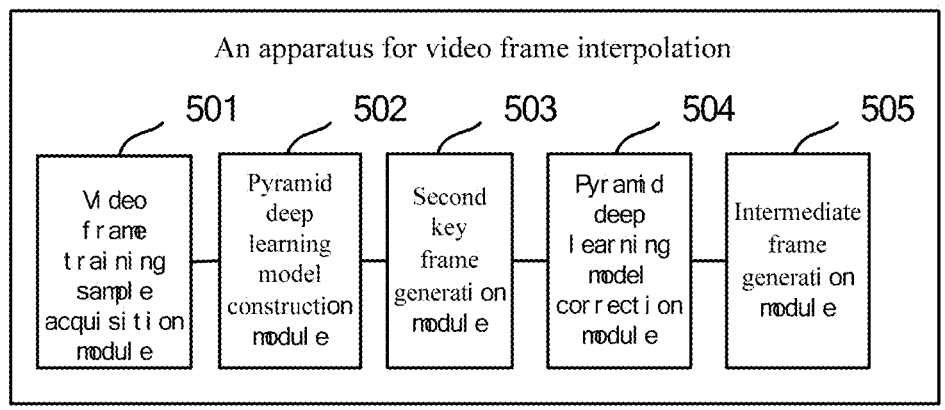
FIG. 5 shows a structural diagram of an apparatus for video frame interpolation corresponding to FIG. 1 according to an embodiment of the present specification.

Based on the same idea, an embodiment of the present specification further provides an apparatus corresponding to the method. FIG. 5 shows a structural diagram of an apparatus for video frame interpolation corresponding to FIG. 1 according to an embodiment of the present specification. As shown in FIG. 5, the apparatus may comprise:

a video frame training set acquisition module 501 configured for acquiring a video frame training sample, wherein the video frame training sample includes an even number of consecutive video frames and a first key frame, and the first key frame is an intermediate frame of the even number of consecutive video frames;

a pyramid deep learning model construction module 502 configured for a pyramid deep learning model, wherein each level of the pyramid deep learning model being used to generate intermediate frames of different resolutions has a plurality of convolutional neural network layers;

a second key frame generation module 503 configured for inputting the even number of consecutive video frames to the pyramid deep learning model to generate a second key frame;

a modified pyramid deep learning model 504 modification module configured for modifying the pyramid deep learning model according to the second key frame and the first key frame to generate a modified pyramid deep learning model;

an intermediate frame generation module 505 configured for inputting a plurality of video frames to be processed into the modified pyramid deep learning model to generate an intermediate frame of the plurality of video frames.

Further, the second key frame generation module 503 may specifically comprise:

a first resolution determination unit configured for determining a first resolution of a video frame inputted to the first level of the pyramid deep learning model according to a preset rule;

a first resolution processing unit configured for processing the even number of consecutive video frames according to the first resolution;

an optical flow set and an occlusion mask set generation unit configured for inputting the processed even number of consecutive video frames to the first level of the pyramid deep learning model to generate an optical flow set and an occlusion mask set of the intermediate frame to each video frame of the processed even number of consecutive video frames;

a calculated intermediate frame of the first layer generation unit configured for generating a calculated intermediate frame of the first layer according to the optical flow set and the occlusion mask set;

a first parameter modification unit configured for modifying parameters of the first level of the pyramid deep learning model according to the calculated intermediate frame of the first level and the real intermediate frame with the resolution of the first level;

Further, the second key frame generation module 503 may specifically comprise:

a second resolution determination unit configured for determining a second resolution of the video frame inputted to the K-th level of the pyramid deep learning model according to a preset rule, wherein a resolution of the video frame inputted to the K-th level is higher than a resolution of a video frame inputted to the (K−1)th level, the resolution of the last input video frame of the pyramid deep learning model is the original resolution of the even number of consecutive video frames, and K is a natural number greater than or equal to 2;

a second resolution processing unit configured for processing the even number of consecutive video frames according to the second resolution to generate a video frame inputted to the K-th level;

a first optical flow set generation unit configured for interpolation of each optical stream in the optical flow set generated by the (K−1)th level by upsampling by 2 times to generate a first optical flow set;

a first warped image set generation unit configured for processing the video frame inputted to the K-th level by using each optical flow in the first optical flow set to generate a first warped image set;

a residual flow set and a occlusion mask set of the K-th level generation unit configured for generating a residual flow set and a occlusion mask set of the K-th level according to the first optical flow set and the first warped image set;

an optical flow set of the K-th level generation unit configured for generating an optical flow set of the K-th level according to the first optical flow set and the residual flow set;

a calculated intermediate frame generation unit configured for generating a calculated intermediate frame of the K-th level according to the optical flow set of the K-th level and the occlusion mask set of the K-th level;

a second parameter modification unit configured for modifying parameters of the first level to the K-th level of the pyramid deep learning model according to the calculated intermediate frame of the K-th level and the real intermediate frame with the resolution of the K-th level.

Further, the calculated intermediate frame generation unit may specifically comprise:

a second warped image set generation subunit configured for generating a second warped image set through warping the inputted video frames by optical flow set at the K-th level;

a calculated intermediate frame generation subunit configured for generating a calculated intermediate frame of the K-th level according to the second warped image set and the occlusion mask set of the K-th level.

Further, the calculated intermediate frame generation subunit may specifically comprise:

the calculated intermediate frame of the K-th level is calculated by the following formula:

$$I_{t,k} = \sum_{i=1}^{4} M_{k,i} \otimes w(I_{k,i}, F_{k,i})$$

wherein $I_{t,k}$ denotes a calculated intermediate frame of the K-th level, $M_{k,i}$ denotes an occlusion mask relative to the ith warped image in the first warped image set, $w(I_{k,i}, F_{k,i})$ denotes the i-th warped image in the first set of warped images, $\otimes$ denotes point multiplication of matrices.

Further, the second resolution processing unit may specifically comprise:

a first feature extraction subunit configured for generating a 4D feature map according to the even number of consecutive video frames by using a feature extractor;

a 3D feature map generation subunit configured for splitting the 4D feature map in the depth dimension, and then stacking them in the channel dimension to generate a 3D feature map;

an average pooling processing subunit configured for an average pooling process on the 3D feature map to generate a feature map with the resolution of the K-th level;

a set of input video frames with the resolution of the K-th level generation subunit configured for downsampling the even number of consecutive video frames to generate a set of input video frames with the resolution of the K-th level;

a first input subunit configured for inputting the feature map with the resolution of the K-th level and the set of input video frames with the resolution of the K-th level to the K-th level of the pyramid deep learning model.

Further, the second resolution processing unit may specifically comprise:

a second feature extraction subunit configured for inputting the even number of consecutive video frames to the 3D pyramid feature extractor to generate a 4D feature map;

a 4D feature map processing subunit configured for processing the 4D feature map is processed by using a convolution with a step size of 2 to generate a 4D feature map with the resolution of the K-th level;

a 3D feature map processing subunit configured for splitting the 4D feature map with the resolution of the K-th level in the depth dimension, and then stacking them in the channel dimension to generate a 3D feature map with the resolution of the K-th level;

a downsampling processing subunit configured for downsampling the even number of consecutive video frames to generate a set of input video frames with the resolution of the K-th level;

a second input subunit configured for inputting the 3D feature map with the resolution of the K-th level and the set of input video frames with the resolution of the K-th level to the K-th level of the pyramid deep learning model.

Further, the modified pyramid deep learning model 504 may specifically comprise:

a first feature parameter extraction unit configured for extracting a first characteristic parameter of the first key frame;

a second feature parameter extraction unit configured for extracting a second characteristic parameter of the second key frame;

a difference result generation unit configured for generating a difference result between the first key frame and the second key frame according to the first feature parameter and the second feature parameter;

a weight parameter adjustment unit configured for adjusting weight parameters of the pyramid deep learning model according to the difference result.

Further, the second parameter modification unit may specifically comprise:

a third feature parameter extraction subunit configured for extracting a third characteristic parameter of the calculated intermediate frame by using a multi-level convolution layer of the pre-training network, wherein, the larger the value of K, the more layers of the multi-level convolution layer;

a fourth feature parameter extraction subunit configured for extracting a fourth feature parameter of the real intermediate frame by using the multi-level convolution layer of the pre-training network;

a difference result generation subunit configured for comparing the third feature parameter and the fourth feature parameter by using an L2 paradigm to generate a difference result;

a parameter modification subunit configured for modifying parameters of the first level to the K-th level of the pyramid deep learning model according to the difference result.

Based on the same idea, an embodiment of the present specification further provides an device corresponding to the method.

Figure 6:
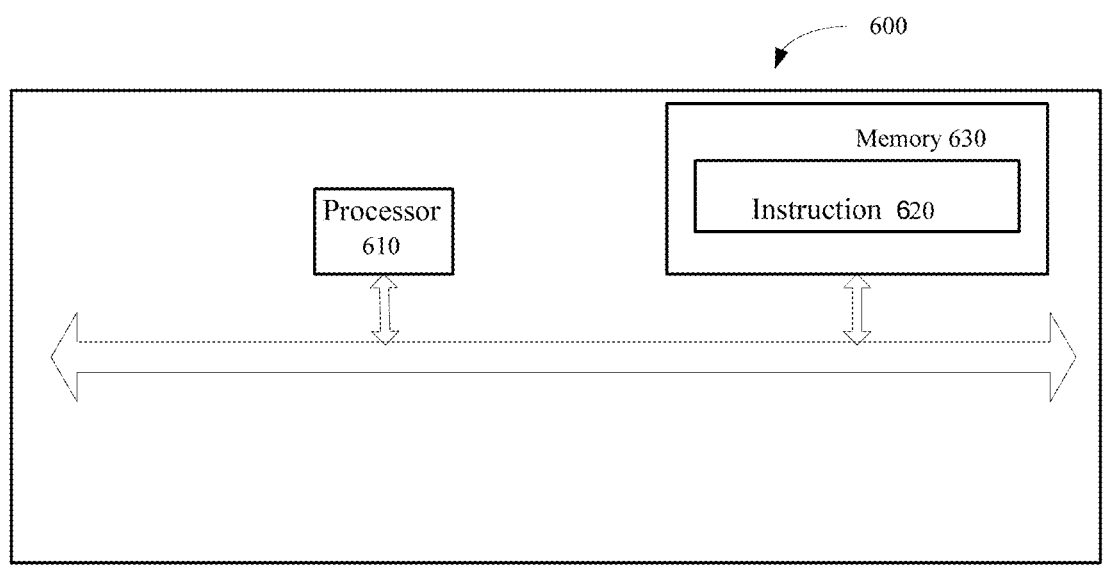
FIG. 6 shows a structural diagram of a device for video frame interpolation corresponding to FIG. 1 according to an embodiment of the present specification.

FIG. 6 shows a structural diagram of a device for video frame interpolation corresponding to FIG. 1 according to an embodiment of the present specification. As shown in FIG. 6, the device 600 can include:

at least one processor 610; and a memory in communication connection with the at least one processor 630; wherein, the memory 630 stores instructions 620 that may be executed by the at least one processor 610; and the instructions 620 is executed by the at least one processor 610 to enable the at least one processor 610 to:

acquiring a video frame training sample, wherein the video frame training sample includes an even number of consecutive video frames and a first key frame, and the first key frame is an intermediate frame of the even number of consecutive video frames;

constructing a pyramid deep learning model, wherein each level of the pyramid deep learning model being used to generate intermediate frames of different resolutions has a plurality of convolutional neural network layers;

inputting the even number of consecutive video frames to the pyramid deep learning model to generate a second key frame;

modifying the pyramid deep learning model according to the second key frame and the first key frame to generate a modified pyramid deep learning model;

inputting a plurality of video frames to be processed into the modified pyramid deep learning model to generate an intermediate frame of the plurality of video frames The system, device, module or unit illustrated in the above embodiments may be implemented by a computer chip or an entity, or by a product with a certain function. A typical implementation device is a computer. Specifically, the computer can be, for example, a personal computer, a laptop, a cellular phone, a camera phone, a smart phone, a personal digital assistant, a media player, a navigation device, an email device, a gaming console, a tablet, a wearable device, or a combination of any devices from above.

For the convenience of description, the above system is described as different units according to the functions thereof respectively. Of course, the functions of the respective modules or units can be performed in the same one or more items of software or hardware in an implementation of the invention.

Those skilled in the art should understand that the embodiments of this application can be provided as method, system or products of computer programs. Therefore, the embodiments of this specification may be realized by complete hardware embodiments, complete software embodiments, or software-hardware combined embodiments. On one or multiple storage media (including but not limit to disk memory, CD-ROM, optical memory etc.

The present description is described in terms of a flowchart, and/or a block diagram of a method, apparatus (system), and computer program product according to embodiments of the present specification. It will be understood that each flow and/or block of the flowcharts and/or block diagrams, and combinations of flows and/or blocks in the flowcharts and/or block diagrams can be implemented by computer program instructions. These computer program instructions can be provided to a processor of a general purpose computer, special purpose computer, embedded processor, or other programmable data processing device to produce a machine for the execution of instructions for execution by a processor of a computer or other programmable data processing device, means for implementing the functions specified in one or more processes and/or block diagrams of one or more blocks of the flowchart.

The computer program instructions can also be stored in a computer readable memory that can direct a computer or other programmable data processing device to operate in a particular manner, such that the instructions stored in the computer readable memory produce an article of manufacture comprising the instruction device, the device implements the functions specified in one or more blocks of a flow or a flow and/or a block diagram of the flowchart.

These computer program instructions can also be loaded onto a computer or other programmable data processing device such that a series of operational steps are performed on a computer or other programmable device to produce computer-implemented processing for execution on a computer or other programmable device, the instructions provide steps for implementing the functions specified in one or more of the flow or in one or more blocks of the flow chart and/or block diagram.

In a typical configuration, the computing device includes one or more processors (CPUs), input/output interfaces, network interfaces, and memory.

The memory may include non-persistent memory, random access memory (RAM), and/or non-volatile memory in a computer readable medium, such as read only memory (ROM) or flash memory. Memory is an example of a computer readable medium.

The computer readable medium includes both permanent and non-permanent, removable and non-removable, and the medium can be implemented by any method or technology. Information can be computer readable instructions, data structures, modules of programs, or other data. Examples of computer storage media include, but are not limited to, phase change memory (PRAM), static random access memory (SRAM), dynamic random access memory (DRAM), other types of random access memory (RAM), read only memory (ROM), electrically erasable programmable read only memory (EEPROM), flash memory or other memory technology, compact disk read only memory (CD-ROM), digital versatile disk (DVD) or other optical storage, Magnetic tape cartridges, magnetic tape storage or other magnetic storage devices or any other non-transportable media that can be used for storage or information accessed by computing devices. As defined herein, computer readable media does not include temporary storage computer readable media, such as modulated data signals and carrier waves.

It is also to be understood that the terms "comprising" or "containing" or any other variations are intended to encompass a non-exclusive inclusion, lead to a process, method, commodity, or device that includes a series of elements includes not only those elements but also other elements not explicitly listed, or elements that are inherent to the process, method, article, or device. In the absence of more restrictions, elements defined by the phrase "comprising a . . . " do not exclude the presence of additional identical elements in the process, method, article, or device that includes the element.

This description can be described in the general context of computer-executable instructions executed by a computer, such as a program module. Generally, program modules include routines, programs, objects, components, data structures, and the like that perform particular tasks or implement particular abstract data types. It is also possible to practice the description in a distributed computing environment in which tasks are performed by remote processing devices that are connected through a communication network. In a distributed computing environment, program modules can be located in both local and remote computer storage media including storage devices.

The various embodiments in the present specification are described in a progressive manner, and the same or similar parts between the various embodiments may be referred to each other, and each embodiment focuses on the differences from other embodiments. In particular, for the system embodiment, since it is basically similar to the method embodiment, the description is relatively simple, and the relevant parts can be referred to the description of the method embodiment.

The aspects described above is only for the embodiments of the present specification, and is not intended to limit this application. Various changes and variations can be made to the application by those skilled in the art. Any modifications, equivalents, improvements, etc. made within the spirit and principles of the present specification are intended to be included within the scope of the claims of the present specification.

We claim:

1. A method for video frame interpolation, comprising:
   acquiring a video frame training sample, wherein the video frame training sample includes an even number of consecutive video frames and a first key frame, and the first key frame is an intermediate frame of the even number of consecutive video frames;
   constructing a pyramid deep learning model, wherein each level of the pyramid deep learning model being used to generate intermediate frames of different resolutions has a plurality of convolutional neural network layers; from a lower level to an upper level, the resolution is gradually increased, and video frame parameters of a lower level resolution are used for the calculation of the intermediate frame of a higher resolution;
   inputting the even number of consecutive video frames to the pyramid deep learning model to generate a second key frame;
   modifying the pyramid deep learning model according to the second key frame and the first key frame to generate a modified pyramid deep learning model;
   inputting a plurality of video frames to be processed into the modified pyramid deep learning model to generate an intermediate frame of the plurality of video frames.

2. The method according to claim 1, the modifying the pyramid deep learning model according to the second key frame and the first key frame comprises:
   extracting a first characteristic parameter of the first key frame;
   extracting a second characteristic parameter of the second key frame;
   generating a difference result between the first key frame and the second key frame according to the first feature parameter and the second feature parameter;
   adjusting weight parameters of the pyramid deep learning model according to the difference result.

3. A method for video frame interpolation, comprising:
   acquiring a video frame training sample, wherein the video frame training sample includes an even number of consecutive video frames and a first key frame, and the first key frame is an intermediate frame of the even number of consecutive video frames;
   constructing a pyramid deep learning model, wherein each level of the pyramid deep learning model being used to generate intermediate frames of different resolutions has a plurality of convolutional neural network layers;
   inputting the even number of consecutive video frames to the pyramid deep learning model to generate a second key frame;
   modifying the pyramid deep learning model according to the second key frame and the first key frame to generate a modified pyramid deep learning model;
   inputting a plurality of video frames to be processed into the modified pyramid deep learning model to generate an intermediate frame of the plurality of video frames;
   wherein the inputting the even number of consecutive video frames to the pyramid deep learning model comprises:
   determining a first resolution of a video frame inputted to the first level of the pyramid deep learning model according to a preset rule;

processing the even number of consecutive video frames according to the first resolution;
inputting the processed even number of consecutive video frames to the first level of the pyramid deep learning model to generate an optical flow set and an occlusion mask set of the intermediate frame to each video frame of the processed even number of consecutive video frames;
generating a calculated intermediate frame of the first level according to the optical flow set and the occlusion mask set;
modifying parameters of the first level of the pyramid deep learning model according to the calculated intermediate frame of the first level and the real intermediate frame with the resolution of the first level.

4. A method for video frame interpolation, comprising:
acquiring a video frame training sample, wherein the video frame training sample includes an even number of consecutive video frames and a first key frame, and the first key frame is an intermediate frame of the even number of consecutive video frames;
constructing a pyramid deep learning model, wherein each level of the pyramid deep learning model being used to generate intermediate frames of different resolutions has a plurality of convolutional neural network layers;
inputting the even number of consecutive video frames to the pyramid deep learning model to generate a second key frame;
modifying the pyramid deep learning model according to the second key frame and the first key frame to generate a modified pyramid deep learning model;
inputting a plurality of video frames to be processed into the modified pyramid deep learning model to generate an intermediate frame of the plurality of video frames;
wherein the inputting the even number of consecutive video frames to the pyramid deep learning model comprises:
determining a second resolution of the video frame inputted to the K-th level of the pyramid deep learning model according to a preset rule, wherein a resolution of the video frame inputted to the K-th level is higher than a resolution of a video frame inputted to the (K-1)th level, the resolution of the last inputted video frame of the pyramid deep learning model is the original resolution of the even number of consecutive video frames, and K is a natural number greater than or equal to 2;
processing the even number of consecutive video frames according to the second resolution to generate a video frame inputted to the K-th level;
interpolation of each optical stream in the optical flow set generated by the (K-1)th level by upsampling by 2 times to generate a first optical flow set;
processing the video frame inputted to the K-th level by using each optical flow in the first optical flow set to generate a first warped image set;
generating a residual flow set and a occlusion mask set of the K-th level according to the first optical flow set and the first warped image set;
generating an optical flow set of the K-th level according to the first optical flow set and the residual flow set;
generating a calculated intermediate frame of the K-th level according to the optical flow set of the K-th level and the occlusion mask set of the K-th level;
modifying parameters of the first level to the K-th level of the pyramid deep learning model according to the calculated intermediate frame of the K-th level and the real intermediate frame with the resolution of the K-th level.

5. The method according to claim 4, the generating a calculated intermediate frame of the K-th level according to the optical flow set of the K-th level and the occlusion mask set of the K-th level comprises:
generating a second warped image set through warping the inputted video frames by optical flow set at the K-th level;
generating a calculated intermediate frame of the K-th level according to the second warped image set and the occlusion mask set of the K-th level.

6. The method according to claim 5, the generating a calculated intermediate frame of the K-th level according to the second warped image set and the occlusion mask set of the K-th level comprises:
the calculated intermediate frame of the K-th level is calculated by the following formula:

$$I_{t,k} = \sum_{i=1}^{4} M_{k,i} \otimes w(I_{k,i}, F_{k,i})$$

Wherein, $I_{t,k}$ denotes a calculated intermediate frame of the K-th level, $M_{k,i}$ denotes an occlusion mask relative to the ith warped image in the first warped image set, $w(I_{k,i}, F_{k,i})$ denotes the i-th warped image in the first set of warped images, $\otimes$ denotes point multiplication of matrices.

7. The method according to claim 4, the processing the even number of consecutive video frames according to the second resolution comprises:
generating a 4D feature map according to the even number of consecutive video frames by using a feature extractor;
splitting the 4D feature map in the depth dimension, and then stacking them in the channel dimension to generate a 3D feature map;
an average pooling process on the 3D feature map to generate a feature map with the resolution of the K-th level;
downsampling the even number of consecutive video frames to generate a set of input video frames with the resolution of the K-th level;
inputting the feature map with the resolution of the K-th level and the set of input video frames with the resolution of the K-th level to the K-th level of the pyramid deep learning model.

8. The method according to claim 4, the processing the even number of consecutive video frames according to the second resolution comprises:
inputting the even number of consecutive video frames to the 3D pyramid feature extractor to generate a 4D feature map;
processing the 4D feature map by using a convolution with a step size of 2 to generate a 4D feature map with the resolution of the K-th level;
splitting the 4D feature map with the resolution of the K-th level in the depth dimension, and then stacking them in the channel dimension to generate a 3D feature map with the resolution of the K-th level;
downsampling the even number of consecutive video frames to generate a set of input video frames with the resolution of the K-th level;

inputting the 3D feature map with the resolution of the K-th level and the set of input video frames with the resolution of the K-th level to the K-th level of the pyramid deep learning model.

9. The method according to claim 4, the modifying parameters of the first level to the K-th level of the pyramid deep learning model according to the calculated intermediate frame of the K-th level and the real intermediate frame with the resolution of the K-th level comprises:
  extracting a third characteristic parameter of the calculated intermediate frame by using a multi-level convolution layer of the pre-training network, wherein, the larger the value of K, the more layers of the multi-level convolution layer;
  extracting a fourth feature parameter of the real intermediate frame by using the multi-level convolution layer of the pre-training network;
  comparing the third feature parameter and the fourth feature parameter by using an L2 paradigm to generate a difference result;
  modifying parameters of the first level to the K-th level of the pyramid deep learning model according to the difference result.

10. An apparatus for video frame interpolation, comprising:
  a video frame training set acquisition module configured for acquiring a video frame training sample, wherein the video frame training sample includes an even number of consecutive video frames and a first key frame, and the first key frame is an intermediate frame of the even number of consecutive video frames;
  a pyramid deep learning model construction module configured for a pyramid deep learning model, wherein each level of the pyramid deep learning model being used to generate intermediate frames of different resolutions has a plurality of convolutional neural network layers; from a lower level to an upper level, the resolution is gradually increased, and video frame parameters of a lower level resolution are used for the calculation of the intermediate frame of a higher resolution;
  a second key frame generation module configured for inputting the even number of consecutive video frames to the pyramid deep learning model to generate a second key frame;
  a pyramid deep learning model modification module configured for modifying the pyramid deep learning model according to the second key frame and the first key frame to generate a modified pyramid deep learning model;
  an intermediate frame generation module configured for inputting a plurality of video frames to be processed into the modified pyramid deep learning model to generate an intermediate frame of the plurality of video frames.

11. A device for video frame interpolation, comprising:
at least one processor; and
a memory in communication connection with the at least one processor; wherein,
the memory stores instructions that may be executed by the at least one processor; and the instructions are executed by the at least one processor to enable the at least one processor to:
acquiring a video frame training sample, wherein the video frame training sample includes an even number of consecutive video frames and a first key frame, and the first key frame is an intermediate frame of the even number of consecutive video frames;
constructing a pyramid deep learning model, wherein each level of the pyramid deep learning model being used to generate intermediate frames of different resolutions has a plurality of convolutional neural network layers; from a lower level to an upper level, the resolution is gradually increased, and video frame parameters of a lower level resolution are used for the calculation of the intermediate frame of a higher resolution;
inputting the even number of consecutive video frames to the pyramid deep learning model to generate a second key frame;
modifying the pyramid deep learning model according to the second key frame and the first key frame to generate a modified pyramid deep learning model;
inputting a plurality of video frames to be processed into the modified pyramid deep learning model to generate an intermediate frame of the plurality of video frames.

* * * * *